US012179718B1

(12) United States Patent
Chappell et al.

(10) Patent No.: US 12,179,718 B1
(45) Date of Patent: Dec. 31, 2024

(54) APPARATUS AND A METHOD FOR A MULTI-STAGE CAR WASH SYSTEM

(71) Applicant: Quick Quack Car Wash Holdings, LLC, Roseville, CA (US)

(72) Inventors: Christopher Clinton Chappell, Lincoln, CA (US); McNamara Marlow Pope, III, Fair Oaks, CA (US); Rodney Daniel Sparks, Antelope, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/637,290

(22) Filed: Apr. 16, 2024

(51) Int. Cl.
*B60S 3/06* (2006.01)
*A46B 13/02* (2006.01)
*B60S 3/04* (2006.01)
*G06N 20/00* (2019.01)

(52) U.S. Cl.
CPC .............. *B60S 3/063* (2013.01); *A46B 13/02* (2013.01); *B60S 3/042* (2013.01); *G06N 20/00* (2019.01)

(58) Field of Classification Search
CPC .......... A46B 13/02; B60S 3/042; B60S 3/066; B60S 3/06
See application file for complete search history.

(56) References Cited

U.S. PATENT DOCUMENTS

| | | | | |
|---|---|---|---|---|
| 10,710,559 | B2 * | 7/2020 | Belanger | B66F 7/0666 |
| 2015/0273531 | A1 * | 10/2015 | Oliver | B60S 3/04 |
| | | | | 134/123 |
| 2016/0311408 | A1 * | 10/2016 | Belanger | B60S 3/063 |
| 2017/0313289 | A1 * | 11/2017 | Belanger | A46B 13/005 |
| 2019/0176775 | A1 * | 6/2019 | Belanger | A46B 15/0004 |
| 2019/0329738 | A1 * | 10/2019 | Wilson | B60S 3/002 |

FOREIGN PATENT DOCUMENTS

| | | | |
|---|---|---|---|
| CA | 2206601 A1 | 11/1998 | |
| CN | 2546280 Y | 4/2003 | |
| EP | 3683103 A1 | 11/2023 | |
| KR | 20040097721 A | 5/2005 | |
| WO | WO-2020239757 A1 * | 12/2020 | ........... A46B 13/001 |
| WO | WO-2021001487 A1 * | 1/2021 | |

\* cited by examiner

*Primary Examiner* — Michael D Jennings
(74) *Attorney, Agent, or Firm* — Caldwell Intellectual Property Law

(57) ABSTRACT

An apparatus for a multi-stage car wash system is disclosed. The apparatus includes a plurality of sensors, wherein the plurality of sensors is configured to detect location data of a moving object. The apparatus includes a control circuit communicatively connected to the plurality of sensors. The control circuit is configured to identify mirror data as a function of the location data. The control circuit is configured to determine one or more movement metrics as a function of the location data and the mirror data. The apparatus includes an overhead frame mechanically connected to a plurality of rods, wherein the plurality of rods is configured to extend horizontally from the overhead frame. The apparatus also includes a plurality of actuators mechanically connected to the plurality of rods, wherein the plurality of actuators is configured to actuate each rod of the plurality of rods into one or more positions.

20 Claims, 11 Drawing Sheets

① DS mirror bump

③ Front fender cleaning

② PS front cleaning

① DS front cleaning

Eighth Position

⑧ PS rear cleaning

Seventh Position

⑦ DS rear cleaning

Sixth Position

⑥ Rear fender cleaning

Fifth Position

⑤ PS mirror bump

APPARATUS AND A METHOD FOR A MULTI-STAGE CAR WASH SYSTEM

FIELD OF THE INVENTION

The present invention generally relates to the field of vehicle servicing. In particular, the present invention is directed to an apparatus and a method for a multi-stage car wash system.

BACKGROUND

In the rapidly evolving automotive industry, the demand for advanced and efficient car wash systems has increased significantly, particularly in response to the diverse range of vehicle designs and customer preferences. Traditional car wash facilities often struggle to adequately cater to the varying sizes, shapes, and specific cleaning needs of different vehicles, ranging from compact cars to large SUVs and trucks. This is especially true for cleaning the front and rear portions of vehicles.

SUMMARY OF THE DISCLOSURE

In an aspect, an apparatus for a multi-stage car wash system is disclosed. The apparatus includes a plurality of sensors, wherein the plurality of sensors is configured to detect location data of a moving object. The apparatus includes a control circuit communicatively connected to the plurality of sensors and a plurality of actuators. The control circuit is configured to receive the location data from the plurality of sensors. The control circuit is configured to identify mirror data as a function of the location data. The control circuit is configured to determine one or more movement metrics as a function of the location data and the mirror data. The apparatus includes an overhead frame mechanically connected to a plurality of rods, wherein the plurality of rods is configured to extend horizontally from the overhead frame at a first position. The apparatus also includes a plurality of actuators mechanically connected to both the overhead frame and the plurality of rods, wherein the plurality of actuators are configured to actuate each rod of the plurality of rods from the first position to a second position with respect to the moving object as a function of the one or more movement metrics.

In another aspect, a method for a multi-stage car wash system is disclosed. The method includes detecting, using a plurality of sensors, location data of a moving object. The method includes receiving, using at least a control circuit communicatively connected to the plurality of sensors, the location data. The method includes identifying, using the at least a control circuit, mirror data as a function of the location data. The method includes determining, using the at least a control circuit, one or more movement metrics as a function of the location data and the mirror data. The method includes mechanically connecting a plurality of rods to an overhead frame, wherein the plurality of rods is configured to extend horizontally from the overhead frame at a first position. The method includes actuating, using the plurality of actuators, each rod of the plurality of rods from the first position to a second position with respect to the moving object as a function of the one or more movement metrics, wherein the plurality of actuators is mechanically connected to both the overhead frame and the plurality of rods.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

any one or more of the methodologies disclosed herein and any one or more portions thereof.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for a multi-stage car wash system is disclosed. The apparatus includes a plurality of sensors, wherein the plurality of sensors is configured to detect location data of a moving object. The apparatus includes a control circuit communicatively connected to the plurality of sensors and a plurality of actuators. The control circuit is configured to receive the location data from the plurality of sensors. The control circuit is configured to identify mirror data as a function of the location data. The control circuit is configured to determine one or more movement metrics as a function of the location data and the mirror data. The apparatus includes an overhead frame mechanically connected to a plurality of rods, wherein the plurality of rods is configured to extend horizontally from the overhead frame. The apparatus also includes a plurality of actuators mechanically connected to both the overhead frame and the plurality of rods, wherein the plurality of actuators is configured to actuate each rod of the plurality of rods into one or more positions as a function of the one or more movement metrics. Exemplary embodiments illustrating aspects of the present disclosure are described below in the context of several specific examples.

Figure 1:
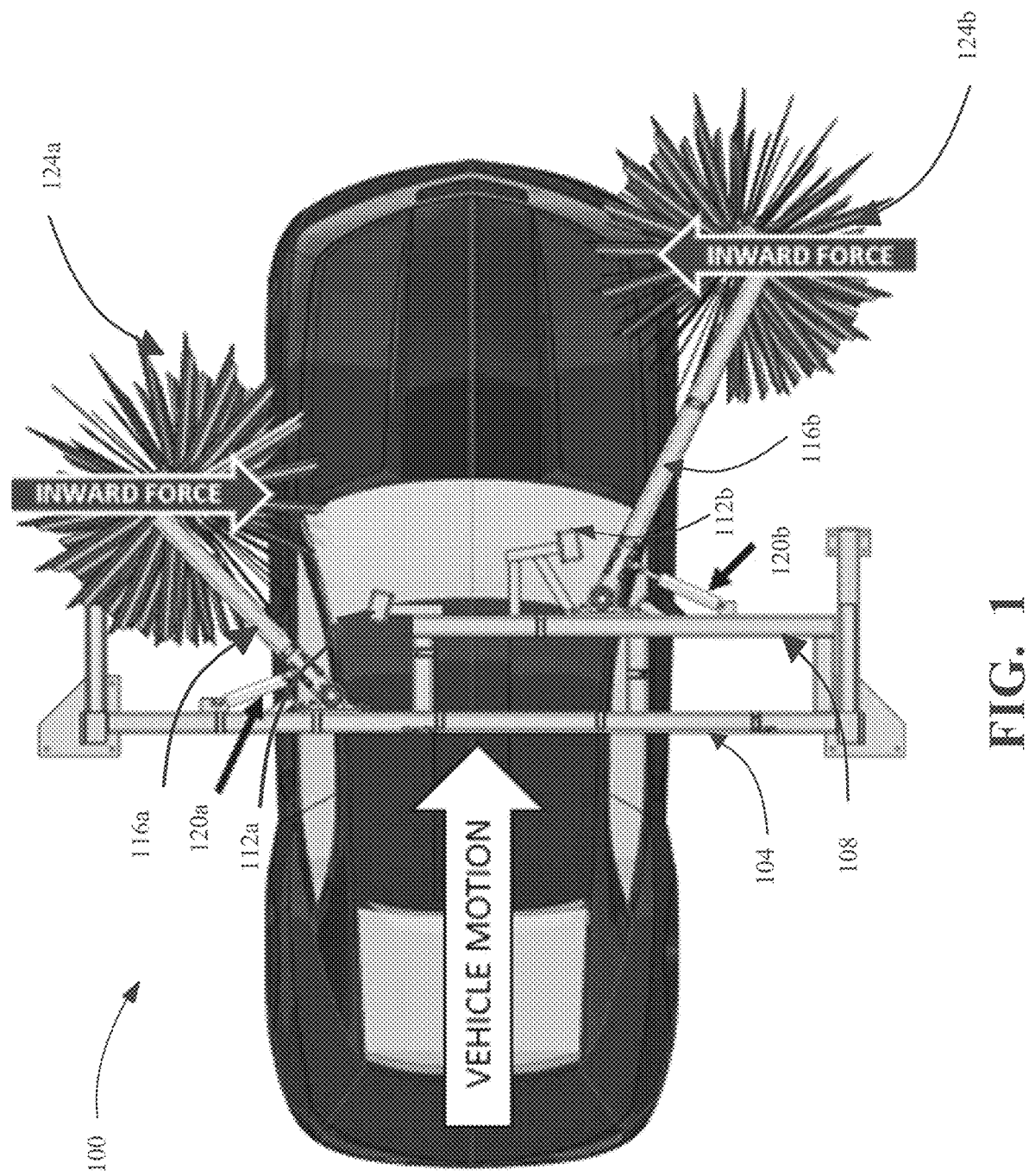
FIG. 1 is an illustration of an exemplary embodiment of a service environment.

Referring now to FIG. 1, an exemplary embodiment of service environment 100. As used in the current disclosure, a "service environment," is a specialized area designed to provide various maintenance and cleaning services for vehicles. Service may include general maintenance, washing, cleaning, body work, manufacturing, and the like. Service environment 100 may be a comprehensive and specialized area dedicated to providing a wide array of maintenance and cleaning services for vehicles. This service environment may cater to various automotive needs, ranging from general maintenance to more specific tasks such as washing, cleaning, body work, and even manufacturing-related services. The layout of service environment 100 may be strategically organized to optimize workflow and efficiency. Service environment 100 may be equipped with advanced diagnostic tools and machinery for routine checks and repairs, such as oil changes, brake services, and engine tune-ups. Service environment 100 may include a washing and cleaning section, where vehicles are treated to a range of cleaning services, from automated car washes to meticulous hand washing and detailing.

With continued reference to FIG. 1, a service environment 100 may include an automated car wash. As used in the current disclosure, an "automated car wash" is a system designed to clean vehicles efficiently and effectively with minimal human intervention. Upon entering the carwash, drivers may encounter a payment station where they can select from various wash options, such as undercarriage cleaning, waxing, or a basic wash. After making their selection and payment, drivers may be guided onto a conveyor system that carefully moves the vehicle through the wash tunnel. Inside this tunnel, the vehicle undergoes a series of cleaning stages, beginning with a pre-soak phase where jets of water and cleaning solutions soften dirt and grime. Following this, rotating brushes and soft cloth strips may gently scrub the vehicle's exterior, while specialized nozzles spray high-pressure water to rinse away loosened debris. Some carwashes also include additional features like wheel cleaning and wax application. The final stage involves powerful air dryers that remove most of the water from the vehicle's surface. This automated process is designed for efficiency, allowing for a thorough cleaning with consistent results in a short amount of time. The convenience and effectiveness of automated carwashes make them a popular choice for vehicle owners looking to maintain their car's appearance with minimal effort.

With continued reference to FIG. 1, service environment 100 may include a conveyor system. As used in the current disclosure, a "conveyor system" is a system designed to efficiently and effectively clean vehicles as they move along a set path. Within an automated car wash, the conveyor system may play a crucial role in ensuring a smooth and efficient washing process. Conveyor system may be designed to move vehicles through different cleaning stages without the need for manual driving. The automated car washing process may begin when the vehicle approaches the entrance of the car wash. Here, the driver is usually instructed to align the vehicle with the conveyor track. Guidance signs or an attendant might be present to assist with proper positioning. As used in the current disclosure, a "conveyor track" is a track designed to transport items or vehicles from one point to another in a controlled and efficient manner. The conveyor track may consists of a long pathway made of durable materials like metal or reinforced rubber. In industrial settings, these tracks can be made of steel or aluminum, while in car washes, they might be made of corrosion-resistant materials to withstand constant exposure to water and cleaning chemicals. For applications like car washes, the track often includes a guidance system that helps align and secure the vehicle onto the track. This system ensures that the vehicle moves smoothly through the wash without veering off course.

With continued reference to FIG. 1, once the vehicle is correctly aligned on the guidance track, the conveyor system may engage with vehicle using an attachment mechanism. As used in the current disclosure, an "attachment mechanism" is a component that connects the conveyor to the items or vehicles it transports. This mechanism ensures that the objects are securely attached to the conveyor system, allowing for smooth and controlled movement through the process. The attachment mechanism may be mechanically connected to a conveyor track and a vehicle simultaneously. This may be done by attaching the attachment mechanism to the vehicle via one or more of its wheels or the one or more of its axels. The attachment mechanism may include rollers, hooks, clamps, magnets, wheel engagers, suction cups, and the like. As used in the current disclosure, a "wheel engager" is an attachment mechanism that is configured to be attached to the wheel of vehicle. With the vehicle in neutral and the braking system disengaged, the conveyor system may gently pull the vehicle forward using the attachment mechanism. The speed of the conveyor is precisely controlled to synchronize with the different phases of the washing process and the position of other vehicles. The positioning of the attachment mechanism along the guidance track may be determined by the movement metric as described in detail below. The movement metric may denote the movement and position of each attachment mechanism along the guidance track. As the vehicle moves along the conveyor, it passes through various cleaning stages. These might include pre-soaking, brushing, high-pressure rinsing, and applying soap or wax. Each stage has equipment positioned to effectively clean the vehicle as it passes by. The conveyor system is designed to accommodate a range of vehicle sizes and shapes, moving them safely through the wash tunnel. Sensors and automatic controls are often used to adjust the conveyor's speed and the spacing between vehicles, preventing collisions and ensuring a smooth flow.

With continued reference to FIG. 1, apparatus 100 may include an overhead frame 104. As used in the current disclosure, an "overhead frame" is a structural component that is configured to be mechanically attached to a number of accessories. The overhead frame 104 may be configured to span the width and/or length of the car wash bay, allowing it to accommodate a wide range of vehicle sizes, from compact cars to larger SUVs and vans. Structurally, the overhead frame 104 may be composed of a robust, corrosion-resistant material, suitable for the wet and chemically active environment of a car wash. It may be engineered for durability and longevity, withstanding the constant stresses of the car wash operation. The design of the overhead frame 104 may incorporate modular sections, allowing for easy maintenance, replacement of parts, and potential upgrades to the system. This frame may be used to mount and support various car wash equipment. This includes rotating brushes, high-pressure nozzles, spray arches, drying systems, lighting, a plurality of sensors, a plurality of rods, a plurality of actuators, mechanical equipment, electrical equipment, and the like. These components are strategically positioned to optimize the cleaning process, ensuring thorough and uniform coverage of the vehicle. The frame may be equipped with advanced sensor technology, enabling it to detect the presence and dimensions of a vehicle as it enters the wash bay (i.e., Location data 408 and mirror data 416). This data is used to adjust the positioning and movement of the cleaning components in real-time, adapting to the unique contours and size of each vehicle. In an embodiment, an overhead frame may house the necessary plumbing for water delivery and drainage, as well as electrical wiring for powering the wash equipment.

With continued reference to FIG. 1, a plurality of rods 116 may be mechanically attached to the overhead frame 104. As used in the current disclosure, a "rod" is a rod is a long straight object. A rod 116 may take on a plurality of geometries including cylindrical and/or a rectangular prism. A rod 116 may be single rod or a combination of rods or beams that extend from the overhead frame 104. This may include a rod, a steel beam, a frame, truss like structures, and the like. The overhead frame 104 may serve as the primary support structure for various car wash components. Attached to this frame are multiple rods 116, which are integral to the operation of the car wash. These rods may be configured to extend horizontally outward from the frame, providing a means to position and maneuver various cleaning elements such as brushes, spray nozzles, and drying materials in close proximity to the vehicle surfaces. In an embodiment, these rods may be configured to extend from the frame in the same direction that the vehicle is moving. Each rod 116 in the plurality is constructed from durable materials, capable of withstanding the wet, chemically diverse, and physically demanding environment of a car wash. Materials such as reinforced aluminum, stainless steel, or high-strength composites are selected for their balance of lightweight properties, strength, and corrosion resistance. The rods may be designed to be actuated according to the positioning of the vehicle within the car wash, allowing them to adjust their coverage of the vehicle based on the size and shape of the vehicles being serviced. The actuation of these rods 116 offer several degrees of angular movement. This feature enables the cleaning elements to maintain optimal orientation and contact with the vehicle surfaces, adapting to the contours and angles of different vehicle designs. This actuation mechanism may be facilitated by an integrated motorized system or pneumatic systems, which can be precisely controlled by the movement metric. This system allows the rods to rotate in a clockwise direction or counterclockwise direction from the attachment point on the overhead frame 104. To accommodate different types and sizes of cleaning equipment, the rods may incorporate versatile mounting points. These mounting points are standardized to allow for quick attachment or detachment of various cleaning components, providing flexibility in configuring the car wash system for different cleaning tasks. In an embodiment, the plurality of rods 116 may include telescopic design. A telescopic design on a rod is a feature that allows the rod to extend and retract, providing convenient portability and adjustable length. The telescopic mechanism may consist of nested sections that can be easily expanded or collapsed. In an embodiment, an actuator may be used to adjust the rod's length telescopically according to the vehicles' size.

With continued reference to FIG. 1, a plurality of bump stops 112 may be mechanically affixed to the overhead frame 104. As used in the current disclosure, a "bump stop" is a mechanical component used to limit the rotational movement of a rod 116, preventing it from rotating beyond a certain angle or point. The bump stop 112 itself may be a robust, small-sized block or cylinder made of a durable material like rubber, polyurethane, or metal. It's designed to absorb impact and prevent damage to the rotating rod 116 or the machinery. The bump stop may be mounted close to the rotating rod on the overhead frame 104 and/or the extended portion 108. The mounting mechanism might involve a bracket or a clamp that securely attaches the bump stop to a stationary part of the machine or vehicle, ensuring it remains in the correct position to interact with the rotating rod. A bump stop may include at least one contact surface. Wherein the contact surface is configured to make contact with a portion of the rod 116. The contact surface may be slightly curved or contoured to match the shape of the rod, allowing for a more efficient and smoother interaction when the rod reaches its maximum rotation angle. In an embodiment, some bump stops 112 may have features to adjust the point at which they restrict the rod's rotation, allowing for customization according to different requirements.

With continued reference to FIG. 1, a plurality of rods 116 may include a first rod 116a and a second rod 116b. Each rod of the plurality of rods 116 may be configured to be of equal length. In some cases, one rod may be longer than the second rod. In an embodiment, a first rod 116a may be mechanically attached to the overhead frame 104 and the second rod 116b may be attached to an extended portion 108 of the overhead frame 104. As used in the current disclosure, an "extended portion" is a portion of the overhead frame 104 that projects horizontally form the frame. When the second rod 116b is attached to the extended portion 108 may allow the second rod 116b to extend past the first rod 116a. The purpose of this configuration may be to provide additional coverage or to allow the car wash system to adapt to vehicles of different sizes or shapes. This design feature effectively increases the reach of the frame, allowing it to extend further out from its central axis or core structure. The extended portion 108 may be made of the same or similar materials as the overhead frame 104. In an embodiment, the extended portion 108 may include one or more telescopic mechanisms configured to extend and/or retract the extended portion of overhead frame 104. This may be done to adjust the reach of the rods 116 around a larger vehicle. Alternatively, this may be done to reduce the reach of a rods 116 to accommodate smaller vehicles. In an embodiment, an actuator may be attached to each portion of the extended portion 108. These actuators may be configured to extend or retract the extended portion as a function of the vehicle data. For example, when a large vehicle such as an SUV or truck is within the service area the extended portion may be extended. However, when smaller vehicles such as smart cars and/or compact cars are in the service area the extended portion may be retracted.

With continued reference to FIG. 1, a plurality of actuators 120 is mechanically attached to the overhead frame 104. As used in the current disclosure, an "actuator" is a type of device used to move each rod of the plurality of rods. An actuator 120 may be electric, pneumatic, hydraulic, and the like. Each actuator 120 of the plurality of actuators 120 may be uniquely configured to actuate a specific rod in the car wash system. In an embodiment, the plurality of actuators 120 may include a first actuator 120a and a second actuator 120b. A first actuator 120a may be configured to actuate the first rod 116a, while the second actuator 120b may be configured to actuate the second rod 116b. The firsts actuator 120a may be configured to actuate the first rod in a clockwise motion, whereas the second actuator 120b may be configured to actuate the second rod ins a counterclockwise motion. The pivot point of the first rod 116a may be located the mechanical attachment point on the overhead frame 104, whereas the pivot point of the second rod 116b may be located at the attachment point on the extended portion of the overhead frame 104. This directional control may be crucial for effective and efficient cleaning. The clockwise and counterclockwise movements allow the rods, and thus the attached cleaning elements (such as brushes or spray nozzles), to adapt to the vehicle's contours, ensuring thorough cleaning coverage.

With continued reference to FIG. 1, an actuator 120a-b may include a component of a machine that is responsible for moving and/or controlling a mechanism or system. An actuator 120a-b may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than a control signal. This may include a main energy source, which may include for example electric power, hydraulic power, pneumatic power, mechanical power, and the like. In some cases, upon receiving a control signal, an actuator 120a-b responds by converting source power into mechanical motion. In some cases, an actuator 120a-b may be understood as a form of automation or automatic control.

With continued reference to FIG. 1, in some embodiments, actuator 120a-b may include a hydraulic actuator. A hydraulic actuator may consist of a cylinder or fluid motor that uses hydraulic power to facilitate mechanical operation. Output of hydraulic actuator 120a-b may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator 120a-b may include a pneumatic actuator 120a-b. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator 120a-b may include an electric actuator. Electric actuator 120a-b may include any electromechanical actuators, linear motors, and the like. In some cases, actuator 120a-b may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator 120a-b may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be controlled directly controlled by a control signal for controlling one or more linear motor parameters. Exemplary linear motor parameters include without limitation position, force, velocity, potential, and current.

With continued reference to FIG. 1, in some embodiments, an actuator 120a-b may include a mechanical actuator 120a-b. In some cases, a mechanical actuator 120a-b may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator Mechanical actuators may employ any number of mechanism, including for example without limitation gears, rails, pulleys, cables, linkages, and the like.

With continued reference to FIG. 1, each rod of the plurality of rods may be mechanically attached to a cleaning attachment 124. As used in the current disclosure, a "cleaning attachment" is a component or device that is affixed one or more rods and are designed specifically to aid in the cleaning process. Cleaning attachments 124 may include rotating brushes. These brushes may be made from soft, durable bristles, rotating brushes spin at controlled speeds to scrub the vehicle's surface, removing dirt, grime, and debris. Some brushes are designed to clean specific parts of the vehicle, like tire brushes for wheels and lower body brushes for the sides of the car. Cleaning attachments 124 may include high pressure spray nozzles. These nozzles may emit water at high pressure to rinse and clean the vehicle. They may be used both at the beginning of the car wash cycle to wet and loosen dirt and at the end to rinse off soap and cleaning agents. Some spray nozzles may be configured to apply specialized cleaning solutions or wax. Cleaning attachments 124 may include one or more foam applicators. Foam applicators may dispense soap or cleaning foam onto the vehicle. The foam helps in breaking down and lifting dirt from the car's surface. The foam may have additional properties like lubrication to reduce the risk of scratches during brushing. Cleaning attachments 124 may include cloth strip brushes. These attachments consist of long, soft, cloth strips or pads that gently wipe and clean the vehicle's surface. This attachment may be configured to rotate to enhance the cleaning process They may be particularly effective for delicate finishes and are used in "touchless" or "soft-touch" car washes. Cleaning attachments 124 may include air dryers and blow dryers. At the end of the wash cycle, air dryers and blowers may be used to remove water from the vehicle's surface. These systems often include powerful fans or blowers positioned above or alongside the vehicle. Cleaning attachments 124 may include specialized attachments used for cleaning and scrubbing tires and rims.

These might include smaller rotating brushes, water jets, or chemical applicators designed to remove brake dust and road grime from wheels.

Referring now to FIG. 2A-H, an illustration of an exemplary embodiment of a plurality of positions of a plurality of rod. In an embodiment, the plurality of actuators 120 may be communicatively connected to control circuit, as discussed in greater detail herein below. For instance, the plurality of actuators 120 may be configured to actuate each rod 116 of the plurality of rods according to the movement metric. The movement metric may denote that the plurality of rods 116 may be in one of several positions based on the location of the vehicle and the mirrors on the vehicle relative to the cleaning attachments 124 and the plurality of rods 116.

Figure 2D:
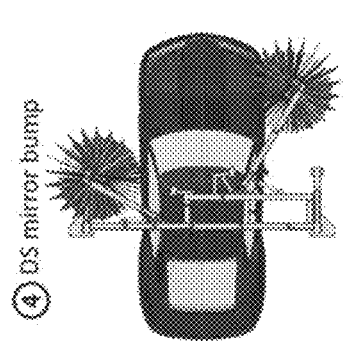
FIG. 2A-H is an illustration of an exemplary embodiment of a plurality of positions of a plurality of rods.
Figure 2C:
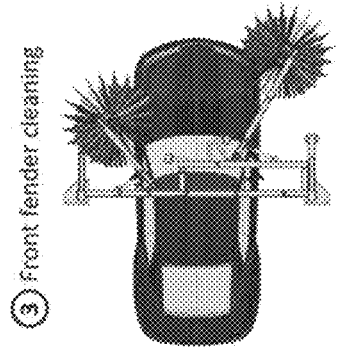
Figure 2B:
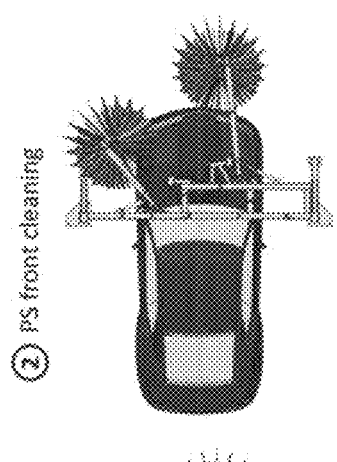
Figure 2A:
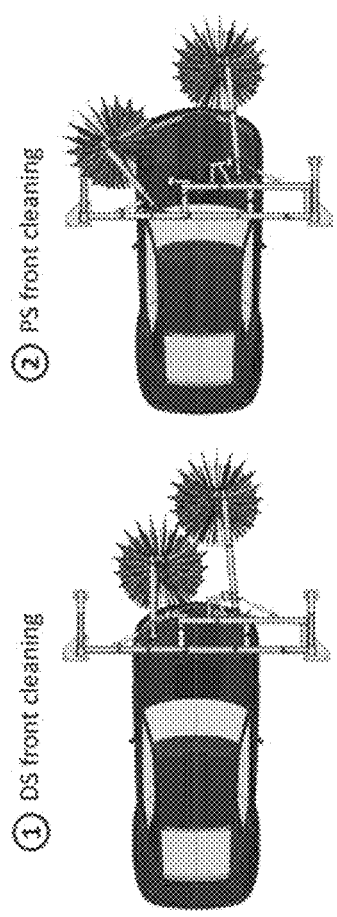

With continued reference to FIG. 2A, the movement metric may instruct the plurality of actuators 120 to place the plurality of rods in a first position. As used in the current disclosure, a "first position" is a position where the plurality of rods 116 are extended forward without any rotation. To be in a first position, the vehicle may be required to be behind both sets of rods and their accompanying cleaning attachments. In the first position, the vehicle may be configured to come in contact with only the first cleaning attachment 124a attached to the first rod 116a. The first cleaning attachment 124a may interface with the vehicle along the vehicles mid-line. This may be done to facilitate the cleaning of the front portion of the driver's side of the vehicle.

With continued reference to FIG. 2B, the movement metric may instruct the plurality of actuators 120 to place the plurality of rods in a second position. As used in the current disclosure, a "second position" is a position where the first rod is slightly rotated counter-clockwise the second rod remains unrotated. The second position may require a vehicle to advance forward form its position in the first position. In the second position, the vehicle may be required to be behind the second rod 116b and the second cleaning attachment 124b. In the second position, the vehicle may be configured to come in contact the first cleaning attachment 124a attached to the first rod 116a on the front portion of the driver's side of the vehicle. The first cleaning attachment 124a may interface with the vehicle along the vehicles mid-line moving towards the front portion of the driver's side. In an embodiment, while the first cleaning attachment 124a is interfacing with the front portion of the driver's side of the vehicle the second cleaning attachment 124b is interfacing with the mid-line of the vehicle and moving towards the passenger side of the vehicle. This may require the second actuator 120b to keep the second rod in a mostly straight position.

With continued reference to FIG. 2C, the movement metric may instruct the plurality of actuators 120 to place the plurality of rods in a third position. As used in the current disclosure, a "third position" is a position where the first rod is slightly rotated counterclockwise and the second rod is rotated slightly clockwise. In the third position, both the first cleaning attachment 124a and the second cleaning attachment 124b are engaged with a front portion of the driver's side and a front portion of a passenger's side, respectively. The first actuator 120a and the second actuator 120b may rotate both of the first rod 116a and the second rod 116b respectively. In the third position, the vehicle may continue to move forward in the service environment relative to the plurality of rods 116 and the overhead frame 104.

With continued reference to FIG. 2D, the movement metric may instruct the plurality of actuators 120 to place the plurality of rods in a fourth position. As used in the current disclosure, a "fourth position" is a position where the first rod is in a bumped-out position and the second rod is slightly rotated clockwise. As used in the current disclosure, a "bumped out position" is a position where at least one rod of the plurality of rods are rotated outward from the vehicle to avoid interaction with the side view mirror of the vehicle. In a bumped-out position, a cleaning attachment 124 may not be engaged with the vehicle. This may mean that the cleaning attachment 124 has no contact with the vehicle in the bumped-out position. The control circuit may instruct plurality of actuators 120 and the plurality of rods 116 to be in a bumped-out position as a function of the mirror data. In an embodiment, once the sensors determine that the sideview mirrors are within a predetermined distance from a cleaning attachment 124, the rod 116 and the cleaning attachment 124 will be rotated outward. This outward rotation may last until the side view mirror has moved past the cleaning attachment 124. The degree that the rod 116 will be outwardly rotated may be determined based on the width of the vehicle and the distance the side view mirrors extend from the body of the vehicle. While the first rod is in the bumped-out position, the second rod may be in a position to allow the cleaning attachment 124b to interact with the front quarter panel of the vehicle.

Figure 2H:
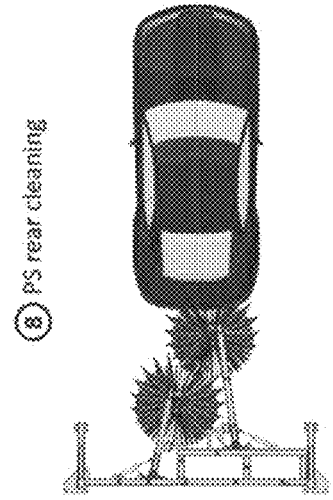
Figure 2G:
Figure 2F:
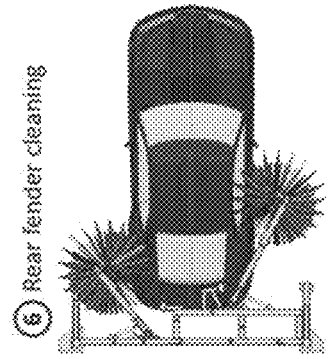
Figure 2E:
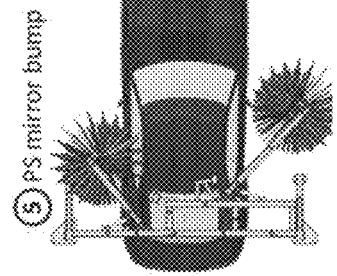

With continued reference to FIG. 2E, the movement metric may instruct the plurality of actuators 120 to place the plurality of rods 116 in a fifth position. As used in the current disclosure, a "fifth position" is a position where the first rod is rotated in a counterclockwise position and the second rod is in a bumped-out position. In an embodiment, the fifth position may include a first cleaning attachment 124a being engaged with a side panel or middle portion of the driver's side of the vehicle. In the fifth position, the vehicle may continue to advance forward relative to the overhead frame 104 and cleaning attachments 124.

With continued reference to FIG. 2F, the movement metric may instruct the plurality of actuators 120 to place the plurality of rods 116 in a sixth position. As used in the current disclosure, a "sixth position" is a position where the first rod is rotated in a counterclockwise and the second rod is rotated clockwise. In the sixth position, the first cleaning attachment 124a may be configured to interact with the rear quarter panel or the rear portion of the driver's side of the vehicle, while the second cleaning attachment 124b may be configured to interact with the side panel or the middle portion of the passenger's side of the vehicle. The sixth position may require that both cleaning attachments 124 are actively cleaning the various portions of the vehicle as it moves forward in the service environment. In a non-limiting example, the movement metric may denote that the transition between the plurality of positions, for example the sixth position and seventh position, begin at a predetermined distance before the rear of the vehicle such that the rotating cleaning attachment 124a-b may lean into the vehicle and quickly curl around the rear bumper.

With continued reference to FIG. 2G, the movement metric may instruct the plurality of actuators 120 to place the plurality of rods in a seventh position. As used in the current disclosure, a "seventh position" is a position where the first rod is unrotated and the second rod is rotated slightly clockwise. The first rod 116a and its accompanying cleaning attachment 124a may be configured to interact with the mid-line of the rear portion of the vehicle. The first rod 116a may be configured to move from its location in the sixth position back to its original unrotated position denoted in the first position. This may facilitate the cleaning of the driver's side rear quarter panel and back portion of the vehicle. Additionally, in the seventh position the second rod 116a and the second cleaning attachment 124*a* may be engaged with the side panel and/or the rear quarter panel of the passenger side.

With continued reference to FIG. 2H, the movement metric may instruct the plurality of actuators 120 to place the plurality of rods in an eighth position. As used in the current disclosure, an "eighth position" is a position where the first rod and the second rod is in an unrotated position. In the eighth position, the vehicle may be in front of the plurality of rods 116 and the cleaning attachments 124. The eighth position may require only the second cleaning attachment 124*b* to be in contact with the vehicle. The second rod 116*b* and its accompanying cleaning attachment 124*b* may be configured to interact with the mid-line of the rear portion of the vehicle. The second rod 116*b* may be configured to move from its location in the seventh position back to its original unrotated position denoted in the first position. This may facilitate the cleaning of the passenger side rear quarter panel and back portion of the vehicle. The movement of the plurality of rods into the seventh and eighth positions may allow the plurality of rods 116 and their accompanying cleaning attachments 124 to effectively clean the rear portion of the vehicle.

Figure 3:
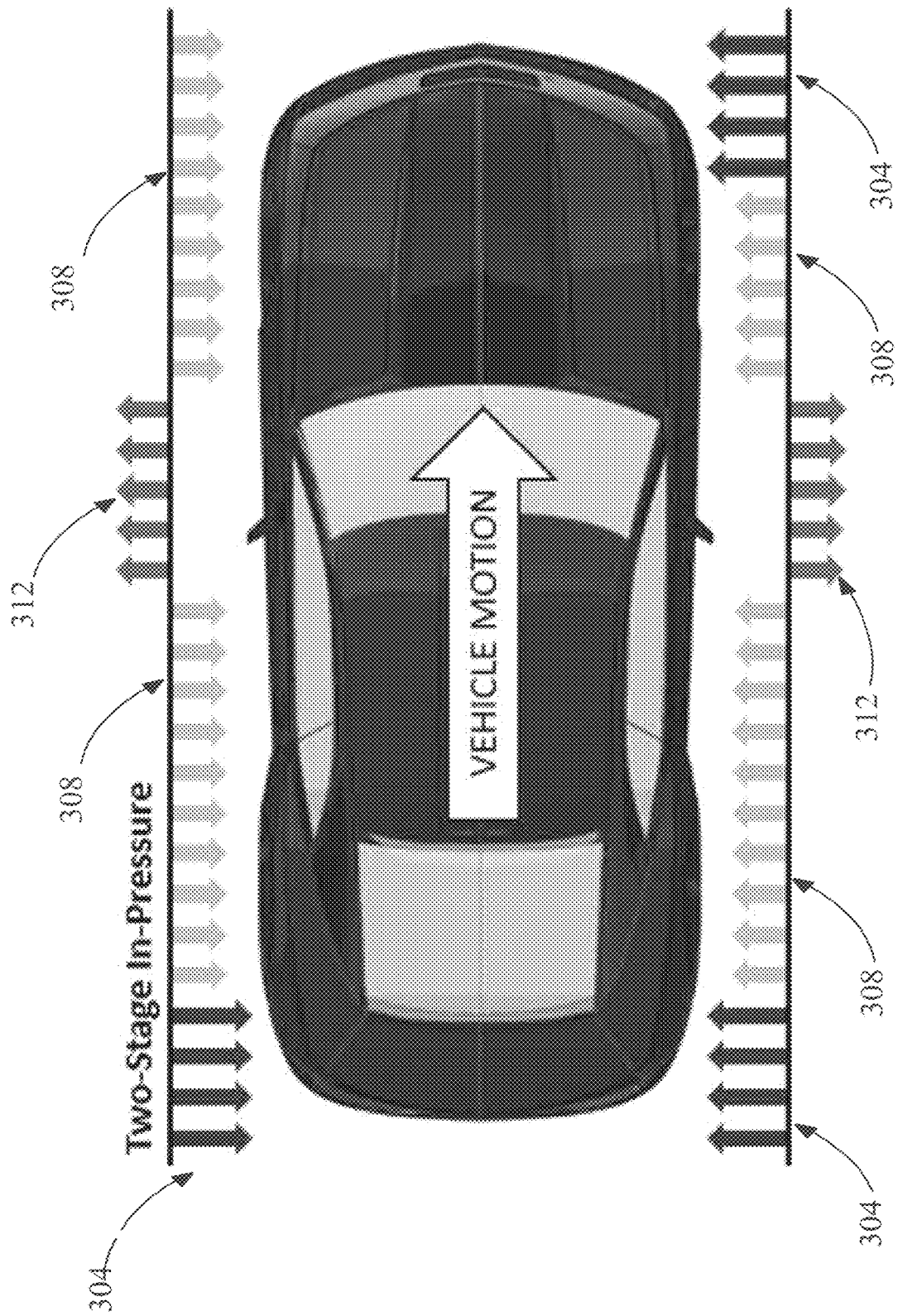
FIG. 3 is an illustration of an exemplary embodiment of a multi-stage in-pressure by a plurality of actuators.

Referring now to FIG. 3, an exemplary illustration of an exemplary embodiment of a multi-stage in-pressure by a plurality of actuators. The plurality of actuators 120*a-b* may be configured to exert varying amounts of pressure on the plurality of rods 116 during each position of the plurality of positions, discussed herein above. As used in the current disclosure, a "pressure stage" refers to a specific phase within the actuator's operation where pressure is applied to generate the force necessary to move the rod into one of a plurality of positions. The control circuit is communicatively connected to each actuator 120 of the plurality of actuators. In an embodiment, the actuators 120 may be configured to change between each of the plurality of pressure stages as a function of the movement metric. The control circuit may use the movement metric to instruct each actuator 120 to go into one of the plurality of pressure stages, wherein the plurality of pressure stages may include a first pressure stage 304, a second pressure stage 308, a third pressure stage, and the like. The force exerted by the actuator 120 in each pressure stage may be determined as a function of the location data and the mirror data.

With continued reference to FIG. 3, the movement metric 420 may instruct the plurality of actuators 120*a-b* to exert pressure on the plurality of rods 116 in a first pressure stage 304. As used in the current disclosure, a "first pressure stage" is a pressure stage wherein at least one rod of the plurality of rods are in a position to interact with the front of the vehicle or the rear of the vehicle. The first pressure stage 304 may require to be near their maximum extension. This means that the rod, for example, rod 116, is in contact with bump stop 112. The bump stop may act as a mechanical limit, preventing further rotation while absorbing and cushioning the impact. The first pressure stage 304 may be characterized by requiring more pressure from the actuators compared to subsequent stages (like the second and third pressure stages). This higher pressure may be necessary to achieve the desired force and position of the rods, especially considering the mechanical resistance from the bump stop and the interaction with the vehicle. Examples of the first pressure stage 304 may be the force exerted by the actuators on the plurality of rods 116 in the first position, second position, seventh position, and the like. The first pressure stage 304 may not be limited to a single position but can occur in various scenarios such as the first, second, seventh positions, etc.

With continued reference to FIG. 3, the movement metric 420 may instruct the plurality of actuators 120*a-b* to exert pressure on the plurality of rods 116 in the second pressure stage 308. As used in the current disclosure, a "second pressure stage" is a pressure stage wherein at least one rod of the plurality of rods are in a position to interact with the side of the vehicle. In this stage, the system may be configured to enable at least one rod from the plurality of rods to interact with the side of the vehicle. In some cases, at second pressure stage 308, movement metric 420 may specify a different amount of pressure compared to the amount of pressure applied during the first pressure stage 304 as described above, to facilitate one or more interactions with vehicle's lateral side (e.g., cleaning vehicle's side panels, quarter panels, and the like); for instance, and without limitation, control circuit may configure plurality of actuators 120*a-b* to exert a moderate pressure that is effective for the tasks of cleaning the vehicle's sides without causing any damage. In some cases, control circuit may be configured to regulate, as a function of movement metric, the pressure and movement of each rod, using plurality of actuators 120*a-b* to ensure a desired amount of force is applied during cleaning process as described herein, examples of the second pressure stage 308 may be the force exerted by the actuators on at least on rod of the plurality of rods 116 in the third position, fourth position, fifth position, sixth, position, and the like.

With continued reference to FIG. 3, the plurality of actuators 120*a-b* may be configured to exert pressure on the plurality of rods 116 in the third pressure stage 312. As used in the current disclosure, a "third pressure stage" is a pressure stage wherein at least one rod of the plurality of rods are in a bumped-out position. The goal of the third stage may be to ensure that the rods avoid contact with protrusions on the vehicle's surface Protrusions can include elements like mirrors, spoilers, antennas, and similar features that are typically vulnerable to damage or require careful handling. The actuators 120*a-b* in the third stage exert minimal force or even negative force on the rod(s) compared to the first and second pressure stages. This may mean that the actuators 120 may be configured to pull each rod backwards rather than push them forward towards the vehicle. This reduced/negative force may be necessary to delicately handle the positioning of the rods, ensuring they do not exert pressure on sensitive areas of the vehicle.

With continued reference to FIG. 3, the control circuit may instruct the plurality of actuators 120*a-b* to exert varying amounts of pressure on the plurality of rods 116 as a function of the movement metric 120. In a non-limiting example, as the vehicle moves through a service area the control circuit 404 may be configured to determine a movement metric 420. The movement metric 420 may instruct the actuator to move between the plurality of pressure stages. For example, as the vehicle first comes into contact with the plurality of cleaning attachments 124, as depicted in FIG. 2B-C, the movement metric may instruct one or more actuators of the plurality of actuators 120 to exert force on the plurality of rods 116 according to the first pressure stage 304. As the vehicle moves forward the movement metric 420 may instruct the plurality of actuators 120*a-b* to exert negative force on the plurality of rods 116 to avoid the side view mirrors of the vehicle as a function of the third pressure stage 312.

Figure 4:
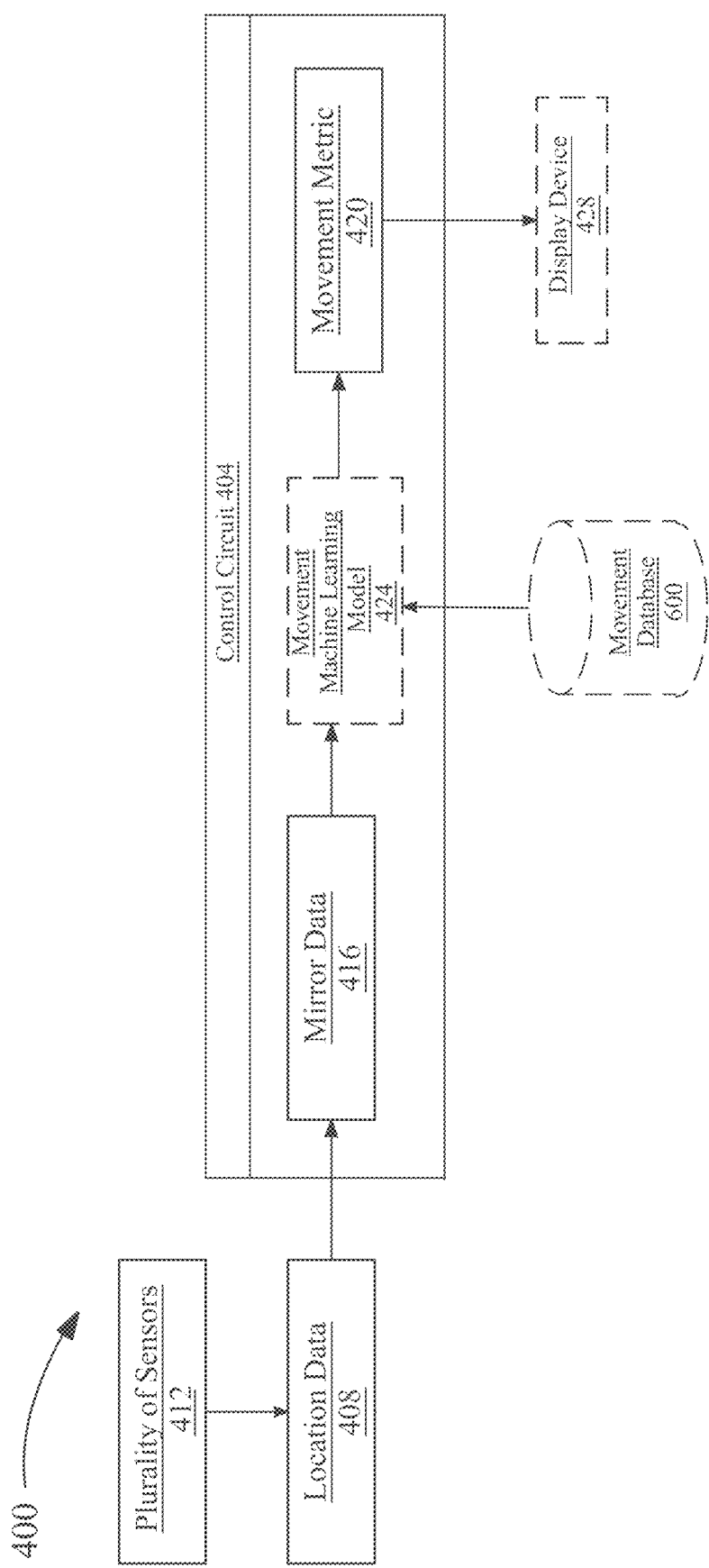
FIG. 4 is a block diagram of an exemplary embodiment of an apparatus for a multi-stage car wash system.

Referring now to FIG. 4, an exemplary embodiment of an apparatus 400 for a multi-stage car wash system is illustrated. Apparatus 400 includes a control circuit 404. Control circuit 404 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone Control circuit 404 may include a single computing device operating independently, or may include two or more computing device operating in concert, in parallel, sequentially or the like; two or more computing devices may be included together in a single computing device or in two or more computing devices. Control circuit 404 may interface or communicate with one or more additional devices as described below in further detail via a network interface device. Network interface device may be utilized for connecting control circuit 404 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Control circuit 404 may include but is not limited to, for example, a computing device or cluster of computing devices in a first location and a second computing device or cluster of computing devices in a second location. Control circuit 404 may include one or more computing devices dedicated to data storage, security, distribution of traffic for load balancing, and the like. Control circuit 404 may distribute one or more computing tasks as described below across a plurality of computing devices of computing device, which may operate in parallel, in series, redundantly, or in any other manner used for distribution of tasks or memory between computing devices. Control circuit 404 may be implemented using a "shared nothing" architecture in which data is cached at the worker, in an embodiment, this may enable scalability of apparatus 400 and/or computing device.

With continued reference to FIG. 4, control circuit 404 may be designed and/or configured to perform any method, method step, or sequence of method steps in any embodiment described in this disclosure, in any order and with any degree of repetition. For instance, control circuit 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Control circuit 404 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, apparatus 400 includes a memory. Memory is communicatively connected to control circuit 404. Memory may contain instructions configuring control circuit 404 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 4, control circuit 404 may be configured to receive a plurality of location data 408 associated with a moving object. As used in the current disclosure, a "moving object" is an object that is moving within a service environment. In a non-limiting example, the moving object may include a vehicle. As used in the current disclosure, "location data" refers to information related to how a vehicle navigates and operates in a specific area. Location data may typically be focused on tracking the precise position and movement of the vehicle as it progresses through the car wash or service area. Location data 408 may include geospatial information related to the vehicles. This may include information related to where the vehicle is located within the service area or conveyor system. In an embodiment, this might include specific X, Y, Z coordinates if the car wash system is designed to track vehicles in a three-dimensional space. The X-axis represents the vehicle's movement along the length of the car wash, the Y-axis might indicate lateral movement (if applicable), and the Z-axis could represent vertical movement (such as height variations in the vehicle). In an embodiment, Location data 408 may be taken relative to the overhead frame discussed herein below. This me include a calculation of how far a vehicle extends in front or behind the overhead frame.

Location data 408 may include information related to the speed at which the vehicle is moving through the car wash (either propelled by a conveyor system or by its own power in a drive-through car wash) and its direction (forward, stationary, or in some systems, even backwards). Location data 408 may be generated using GPS trackers or other location-tracking technologies to generate real-time maps of vehicle movement within the service area. Location data 408 may include information related to the speed of the vehicle at different points within the service area.

With continued reference to FIG. 4, control circuit 404 is configured to receive the location data 408 from a plurality of sensors 412. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, movement, distance, speed, dimensions, and the like, into a sensed signal such as a voltage with respect to a reference. Sensor may detect a plurality of generate mirror data 416 and location data 408 and other associated images. In one or more embodiments, and without limitation, sensor may include a plurality of sensors. In one or more embodiments, and without limitation, sensor may include an optical or image sensor such as a camera, a CMOS detector, a CCD detector, a video camera, a photodiode, a photovoltaic cell, a photoconductive device, a thermal and/or infrared camera, one or more temperature sensors, hydrometers, infrared sensors, photoelectric sensors, motion sensors, pressure sensors, sensors, imaging devices, moisture sensors, imaging sensors, force sensors, Hall sensors, and the like. In an embodiment, a sensor may include one or more inductive loop sensors. These sensors may include wires embedded in the road surface at the entry point and/or exit point of a service area. When a vehicle passes over or stops above the loop, the metal in the vehicle alters the magnetic field, which the sensor detects. Sensor may be a contact or a non-contact sensor. In an embodiment, a sensor may include an ultrasonic sensor. An ultrasonic sensor may use sound waves to detect vehicles. When a vehicle passes, it interrupts the sound waves, and the change in echo pattern is detected. In an additional embodiment, a sensor, may include optical sensors. As optical sensor may employ cameras or optical beams are used to visually or via light beams detect the presence and movement of vehicles. Signals may include electrical, electromagnetic, visual, audio, radio waves, or another undisclosed signal type alone or in combination.

Still referring to FIG. 4, the plurality of sensors 412 may include a motion sensor. A "motion sensor." for the purposes of this disclosure, refers to a device or component configured to detect physical movement of an object or grouping of objects (i.e., Vehicle) One of ordinary skill in the art would appreciate, after reviewing the entirety of this disclosure, that motion may include a plurality of types including but not limited to: spinning, rotating, oscillating, gyrating, jumping, sliding, reciprocating, driving, or the like. A motion sensor may be configured to identify the speed and distance associated with the vehicle. A motion sensor may be configured to locate one or more features on a vehicle. This may include the location/speed of a front portion of a vehicle, a back portion of the vehicles, and the side view mirrors of the vehicle. Sensors may include a torque sensor, gyroscope, accelerometer, torque sensor, magnetometer, inertial measurement unit (IMU), pressure sensor, force sensor, proximity sensor, displacement sensor, vibration sensor, among others.

With continued reference to FIG. 4, a plurality of sensor 412 may include a LIDAR (Light Detection and Ranging) sensor. As used in the current disclosure, a "LIDAR sensor" is a sophisticated tool used for measuring distances and mapping environments. In some cases, a LIDAR sensor can be particularly effective in detecting and gathering vehicle data 408. The core working principle of LiDAR involves emitting laser beams and then analyzing the reflected light to determine distances and create a digital 3D representation of the surrounding area. A LiDAR sensor may emit pulses of laser light and measure the time it takes for the light to return after hitting an object. This time-of-flight method allows the sensor to calculate the distance between the sensor and various objects with high precision. In an embodiment, a LIDAR sensor may detect the presence, size, and shape of vehicles within a service environment. This is crucial for collision avoidance, traffic flow analysis, and automated vehicle navigation. In an embodiment, by tracking the change in position of a vehicle over time, LiDAR can accurately measure its speed. This feature is useful in traffic monitoring and law enforcement for speed limit enforcement. In an embodiment, the detailed 3D images produced by LiDAR may allow for the differentiation between various types of vehicles (e.g., cars, trucks, motorcycles) based on size and shape. In some cases, LiDAR can be used to monitor and analyze traffic patterns within a service environment, vehicle density, and flow rates on roads and highways, aiding in traffic management and infrastructure planning. In some cases, LiDAR sensors may be used to create a detailed map of the service environment or vehicle's surroundings, including other vehicles, road boundaries, pedestrians, and obstacles. In some embodiments, LiDAR may work in conjunction with other sensors like cameras, radar, and GPS to provide a comprehensive understanding of the vehicle's environment, enhancing accuracy and reliability.

With continued reference to FIG. 4, a plurality of sensors 412 may include a sensor suite which may include a plurality of sensors that may detect similar or unique phenomena. For example, in a non-limiting embodiment, a sensor suite may include a plurality of voltmeters or a mixture of voltmeters and thermocouples. Apparatus 400 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 4, control circuit 404 may be configured to generate mirror data 416 associated with a moving object as a function of the location data 408. As used in the current disclosure, "mirror data" is information related to the various parameters and dimensions that define the position and orientation of fragile objects on the vehicle. In an embodiment, fragile objects may include any protrusion from the vehicle such as side view mirrors, antennas, gap, lights, spoilers, door handles, and the like.

Side mirrors, also known as wing mirrors or door mirrors, are mirrors found on the exterior of vehicles, are typically mounted on the doors or at the side of the windshield, on both the driver's and passenger's side of a vehicle. Their primary function is to allow the driver to see areas behind and to the sides of the vehicle, outside the driver's peripheral vision or what is directly visible through the rearview mirror. Mirror data 416 may include precise details about where each side mirror is located in relation to the vehicle's body. This could involve measurements from fixed points on the vehicle, like the distance from the front or rear of the vehicle, or relative to components of an overhead frame in environments like a car wash. Mirror data 416 may include data related to the location of the side mirrors as it relates to a portion of the service environment, such as the overhead frame or the brushes. This could mean their proximity to car wash brushes or other elements of the car wash system. This may include the exact location of each mirror in relation to the vehicle's body or other point of reference. It's usually defined in terms of distance from key points like the brushes, front/rear of the vehicle, or the overhead frame. Mirror data 416 may also cover the orientation of the side mirrors—their angle in relation to the vehicle's body. Mirror data 416 may include a calculation how far each mirror extends outward from the body of the vehicle. This data is particularly relevant in scenarios where the vehicle needs to pass through tight spaces, such as in automated car washes or narrow parking environments, where the risk of mirror damage could be high.

With continued reference to FIG. 4, control circuit 404 may be configured to identify a plurality of vehicle data associated with the vehicle. As used in the current disclosure, "vehicle data" is information associated with each vehicle within a service environment. As used in the current disclosure, a "vehicle" is a mobile machine that transports people, goods, or both. It operates on a variety of surfaces, including roads, rail, water, air, and, in some cases, off-road environments. Vehicles are primarily designed for transportation purposes, and they come in numerous types and sizes, each suited for different needs and uses. Vehicles may include cars, trucks, boats, motorcycles, SUVs, industrial equipment, and the like. Vehicle data may include information about the vehicle location, vehicle size, weight, make, model, and the like. Vehicle data may include information associated with a vehicle's physical location. Specifically, this may refer to the vehicles location within a service environment or in relation to a conveyor system, mentioned in greater detail herein below. Vehicle data may include information regarding the dimensions of the vehicle, including length, width, and height. Vehicle data may include information related to the weight of the vehicle. This may be important for load planning, compliance with weight restrictions within the service environment and vehicle handling characteristics. Vehicle data may include information related to the make and model of the vehicle. The make may indicate the company that produced the vehicle (e.g., Ford, Toyota, Tesla). The model of the vehicle refers to a specific model name or designation given by the manufacturer. This may help in identifying the specific type of vehicle within a brand's lineup (e.g., Ford Mustang, Toyota Camry). In some cases, vehicle data may include the year that the vehicle was made.

With continued reference to FIG. 4, control circuit 404 may be configured to generate a movement metric 420 as a function of the location data 408 and the mirror data 416. As used in the current disclosure, a "movement metric" is a quantitative measure to assess and coordinate the actuation of the plurality of actuators. A movement metric 420 may be a set of calculated instructions used to control actuators attached to brushes, particularly in an automated car wash system. This metric ensures that the brushes move in a way that avoids unwanted contact with the side mirrors and the body of the car, thereby preventing damage. The creation of this movement metric 420 relies on integrating both location data 408 (of the vehicle) and mirror data 22 (specifics about the vehicle's side mirrors). A movement metric 420 may be described as a sophisticated, data-driven tool to determine the precise coordination of multiple moving parts, actuators, rods, brushes, and the like. It may be designed to optimize the movement patterns of these mechanisms to enhance efficiency and safety, primarily by minimizing the risk of collisions. Control circuit 404 may use location data 408 to identify the precise position of the vehicle as it moves through the car wash. It provides a reference for where the brushes should be in relation to the vehicle at any given time. Control circuit 404 may also use the mirror data 416 to identify the dimensions, positions, and possibly the extendibility of the side mirrors. It's crucial for understanding how far the brushes need to move to avoid the mirrors. The movement metric 420 may be defined as an algorithm or a set of rules that dictates how the actuating rods adjust the brushes' positions. This metric considers the real-time location data of the vehicle and its mirrors to dynamically adjust the path or movement of the brushes. In some cases, the movement metric may involve spatial calculations that factor in the dimensions and movements of both the brushes and the mirrors to ensure a collision-free operation. The movement metric 420 may include a minimum safe distance that the brushes should maintain from the mirrors and the body of the car. The movement metric 420 may also dictate the speed at which the brushes need to move or retract to maintain this safe distance. The movement metric 420 may calculate the optimal path for the brushes to clean effectively while avoiding the mirror. Given the variability in car sizes and mirror designs, the movement metric 420 may be adaptable to different vehicle profiles. This might involve initial scanning of the vehicle to understand its specific dimensions and mirror configuration.

With continued reference to FIG. 4, control circuit 404 may generate a movement metric 420 using a movement machine-learning model 424. As used in the current disclosure, a "movement machine-learning model" is a machine-learning model that is configured to generate movement metric 420. Movement machine-learning model 424 may be consistent with the machine-learning model described below in FIG. 3. Inputs to the movement machine-learning model 424 may include vehicle data, location data 408, mirror data 416, examples of movement metric 420, and the like. Outputs to the movement machine-learning model 424 may include movement metric 420 tailored to the location data 408 and mirror data 416. Movement training data may include a plurality of data entries containing a plurality of inputs that are correlated to a plurality of outputs for training a processor by a machine-learning process. In an embodiment, movement training data may include a plurality of location data 408 and mirror data 416 correlated to examples of movement metric 420. Movement training data may be received from database 600. Movement training data may contain information about vehicle data, location data 408, mirror data 416, examples of movement metric 420, and the like. In an embodiment, movement training data may be iteratively updated as a function of the input and output results of past movement machine-learning model 424 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 4, control circuit 404 may use user feedback to train or retrain the machine-learning models and/or classifiers described above. For example, machine-learning models and/or classifiers may be trained using past inputs and outputs of classifier. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 4, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the outputted score machine-learning model may be averaged to determine an accuracy score. In some embodiments, an accuracy score may be determined for the scoring of each set of movement metrics 420. Accuracy score or another score as described above may indicate a degree of retraining needed for a machine-learning model and/or classifier. Control circuit 404 may perform a larger number of retraining cycles for a higher number (or lower number, depending on a numerical interpretation used), and/or may collect more training data for such retraining. The discussion within this paragraph and the paragraphs preceding this paragraph may apply to both the score machine learning model.

Still referring to FIG. 4, control circuit 404 may be configured to display the movement metric 420 using a display device 428. As used in the current disclosure, a "display device" is a device that is used to display a plurality of data and other digital content. A display device 428 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances) User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 4, data, processes, procedures, objects, and the like that are discussed herein above may be the same or substantially similar to those that are discussed in Non-provisional application Ser. No. 18/195,633 filed on May 20, 2023 and entitled "METHODS AND APPARATUSES FOR VEHICLE DIMENSIONING IN A CAR WASH," Non-provisional application Ser. No. 18/195,760 filed on May 20, 2023 and entitled "APPARATUS AND METHOD OF VEHICLE PROFILING," Non-provisional application Ser. No. 18/196,517 filed on May 22, 2023 and entitled "METHODS AND APPARATUSES FOR SELF-ADJUSTING CAR WASH EQUIPMENT WITHIN A CAR WASH TUNNEL," Non-provisional application Ser. No. 18/196,147 filed on May 21, 2023 and entitled "METHODS AND APPARATUSES FOR CAR WASH USER EXPERIENCE," Non-provisional application Ser. No. 18/637,237, filed on Apr. 16, 2024 and entitled "AN APPARATUS AND METHODS FOR DRYING A VEHICLE", each of which is incorporated by reference herein in its entirety.

Figure 5:
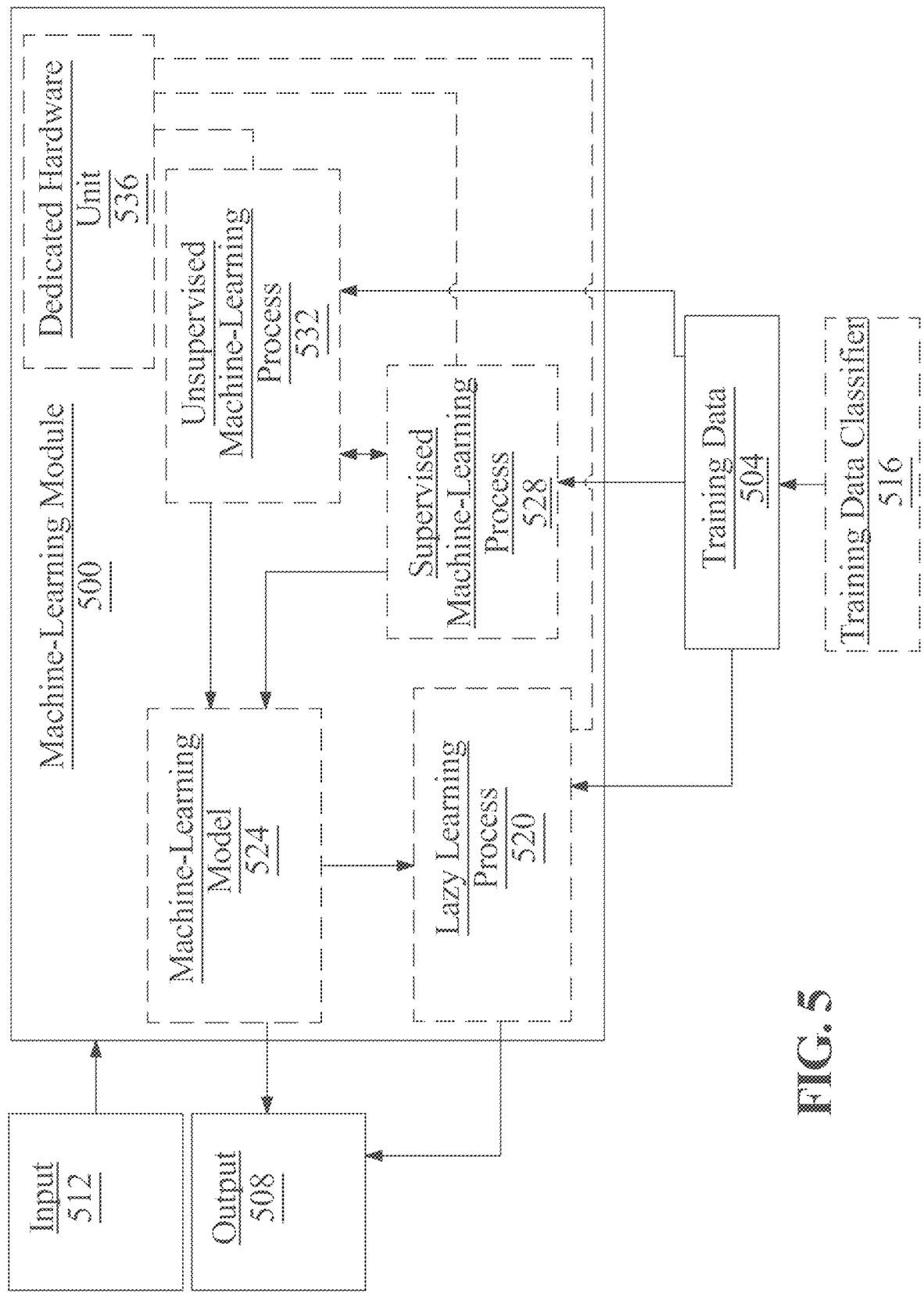
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below Training data 504 used by machine-learning module 500 may correlate any input data as described in this disclosure to any output data as described in this disclosure. As a non-limiting illustrative example location data 408 and mirror data 416 as inputs correlated to examples of location data 408 as outputs.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to various movement metrics 420 to specific makes and models of vehicles.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include location data 408 and mirror data 416 as described above as inputs, correlated to a movement metric 420 as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include the least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
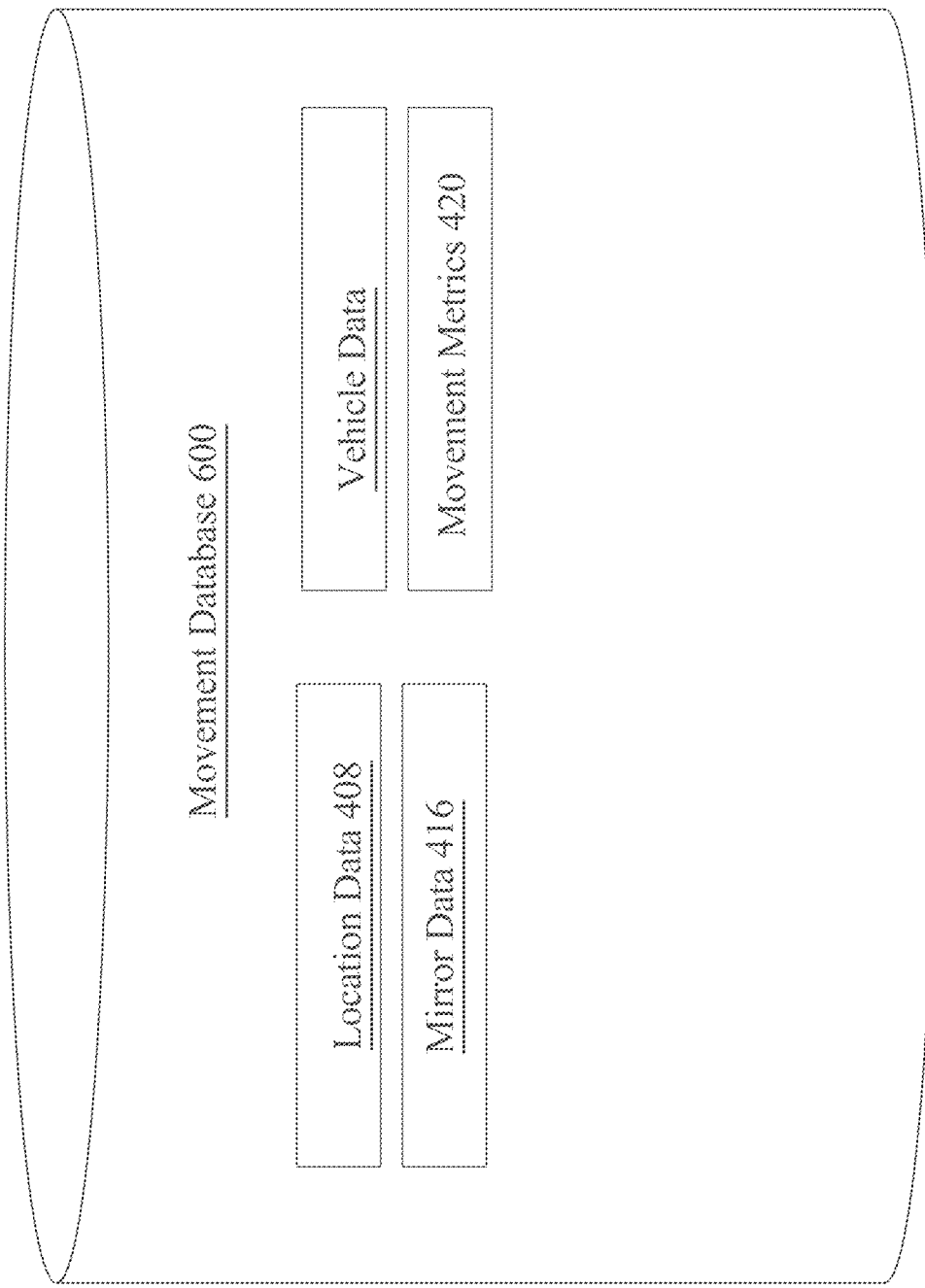
FIG. 6 is a block diagram of an exemplary embodiment of a movement database.

Now referring to FIG. 6, an exemplary movement database 600 is illustrated by way of block diagram. In an embodiment, any past or present versions of any data disclosed herein may be stored within the movement database 600 including but not limited to: vehicle data, mirror data 416, location data 408, movement metrics 420, and the like. Control circuit 404 may be communicatively connected with movement database 600. For example, in some cases, database 600 may be local to control circuit 404. Alternatively or additionally, in some cases, database 600 may be remote to control circuit 404 and communicative with control circuit 404 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure control circuit 404 connects directly, dynamically, and non-hierarchically to as many other computing devices as possible. A "network topology" as used in this disclosure is an arrangement of elements of a communication network. Movement database 600 may be implemented, without limitation, as a relational database, a key-value retrieval database such as a NOSQL database, or any other format or structure for use as a database that a person skilled in the art would recognize as suitable upon review of the entirety of this disclosure. Movement database 600 may alternatively or additionally be implemented using a distributed data storage protocol and/or data structure, such as a distributed hash table or the like. Movement database 600 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 7:
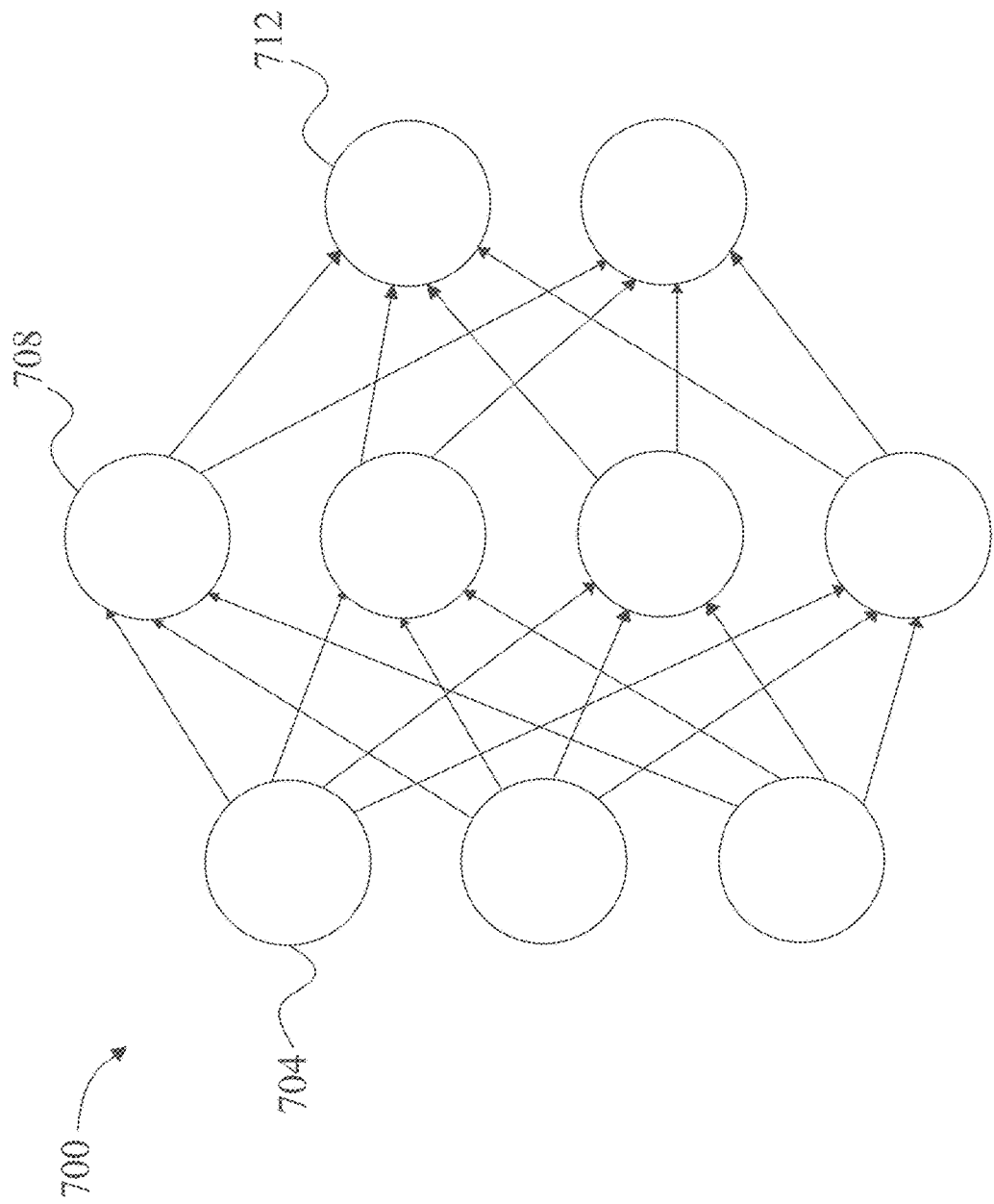
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
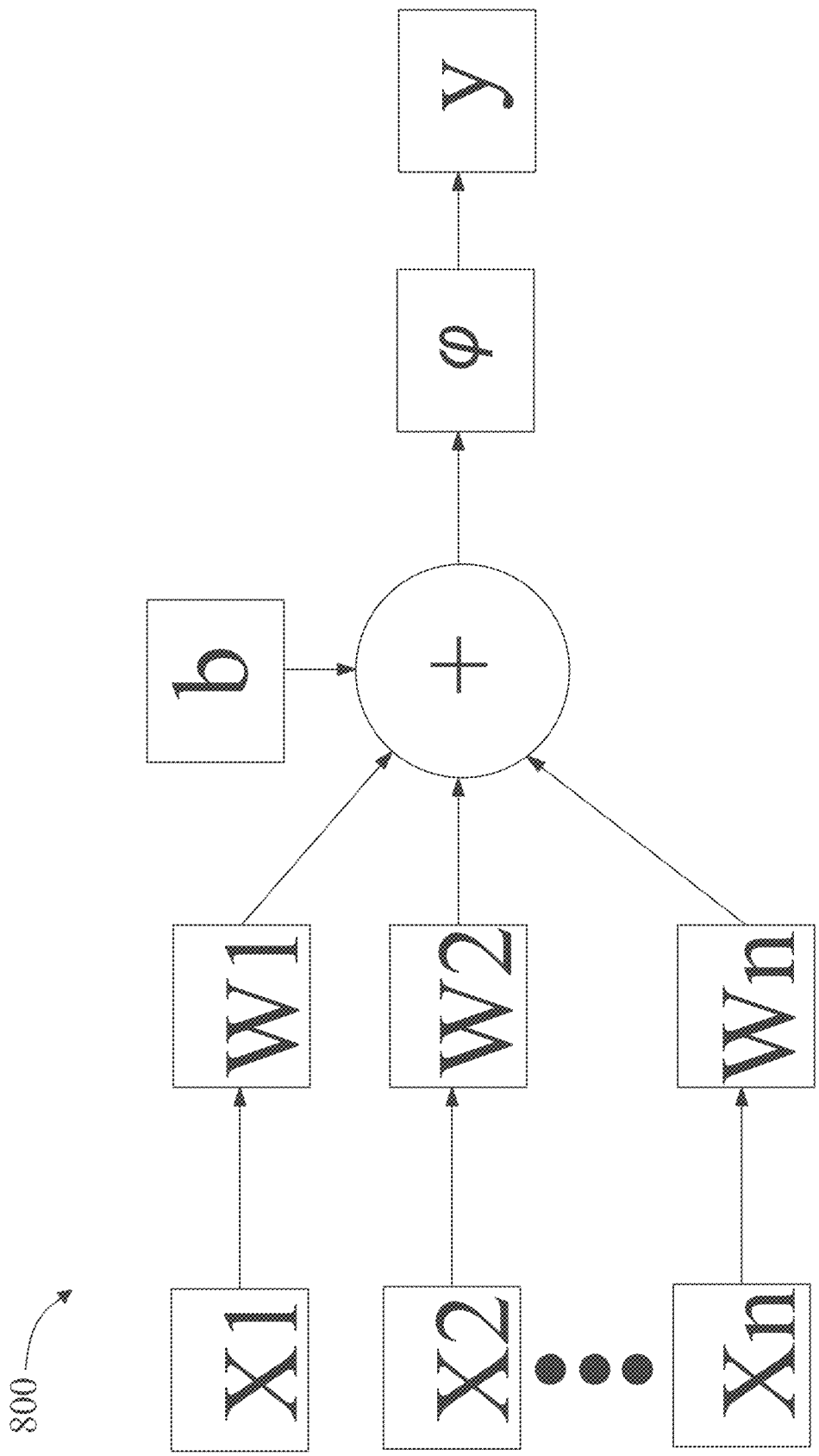
FIG. 8 is a diagram of an exemplary embodiment of a node of a neural network.

Referring now to FIG. 8, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
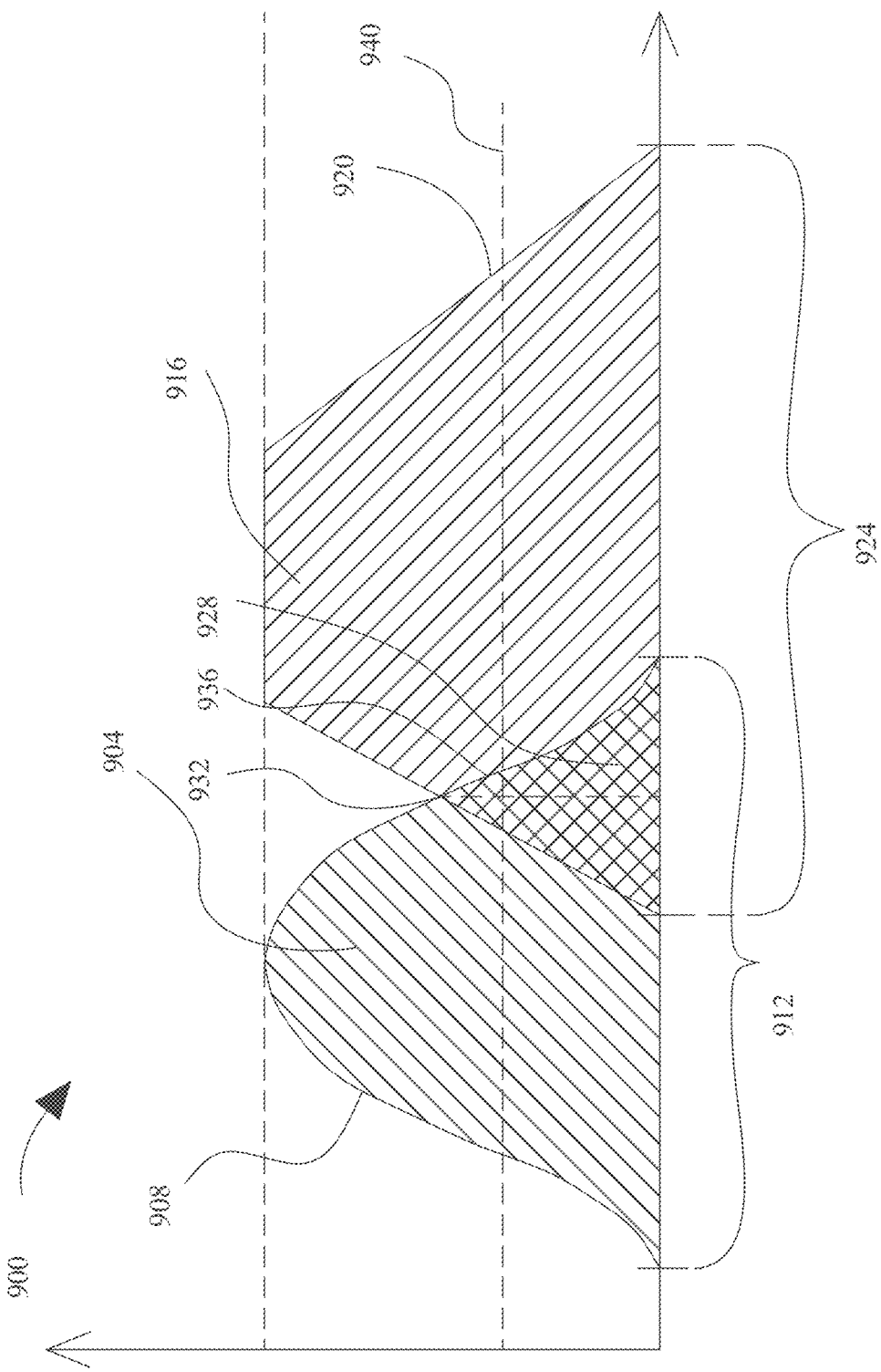
FIG. 9 is an illustration of an exemplary embodiment of fuzzy set comparison.

Now referring to FIG. 9, an exemplary embodiment of fuzzy set comparison 900 is illustrated. In a non-limiting embodiment, the fuzzy set comparison. In a non-limiting embodiment, fuzzy set comparison 900 may be consistent with fuzzy set comparison in FIG. 4. In another non-limiting the fuzzy set comparison 900 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent location data 408 and mirror data 416 from FIG. 4.

Alternatively or additionally, and still referring to FIG. 9, fuzzy set comparison 900 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 9, inference engine may be implemented according to input location data 408 and mirror data 416. For instance, an acceptance variable may represent a first measurable value pertaining to the classification of location data 408 to mirror data 416. Continuing the example, an output variable may represent a movement metric 420 associated with the user. In an embodiment, location data 408 and/or mirror data 416 may be represented by their own fuzzy set. In other embodiments, the classification of the data into a movement metric 420 may be represented as a function of the intersection two fuzzy sets as shown in FIG. 9, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 904 may be represented, without limitation, according to a first membership function 908 representing a probability that an input falling on a first range of values 912 is a member of the first fuzzy set 904, where the first membership function 908 has values on a range of probabilities such as without limitation the interval [0,1], and an area beneath the first membership function 908 may represent a set of values within first fuzzy set 904. Although first range of values 912 is illustrated for clarity in this exemplary depiction as a range on a single number line or axis, first range of values 912 may be defined on two or more dimensions, representing, for instance, a Cartesian product between a plurality of ranges, curves, axes, spaces, dimensions, or the like. First membership function 908 may include any suitable function mapping first range 912 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 904 may represent any value or combination of values as described above, including any location data 408 and mirror data 416. A second fuzzy set 916, which may represent any value which may be represented by first fuzzy set 904, may be defined by a second membership function 920 on a second range 924; second range 924 may be identical and/or overlap with first range 912 and/or may be combined with first range via Cartesian product or the like to generate a mapping permitting evaluation overlap of first fuzzy set 904 and second fuzzy set 916. Where first fuzzy set 904 and second fuzzy set 916 have a region 936 that overlaps, first membership function 908 and second membership function 920 may intersect at a point 932 representing a probability, as defined on probability interval, of a match between first fuzzy set 904 and second fuzzy set 916. Alternatively or additionally, a single value of first and/or second fuzzy set may be located at a locus 936 on first range 912 and/or second range 924, where a probability of membership may be taken by evaluation of first membership function 908 and/or second membership function 920 at that range point. A probability at 928 and/or 932 may be compared to a threshold 940 to determine whether a positive match is indicated. Threshold 940 may, in a non-limiting example, represent a degree of match between first fuzzy set 904 and second fuzzy set 916, and/or single values therein with each other or with either set, which is sufficient for purposes of the matching process; for instance, the classification into one or more query categories may indicate a sufficient degree of overlap with fuzzy set representing location data 408 and mirror data 416 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both location data 408 and mirror data 416 have fuzzy sets, movement metric 420 may be generated by having a degree of overlap exceeding a predictive threshold, control circuit 404 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 10:
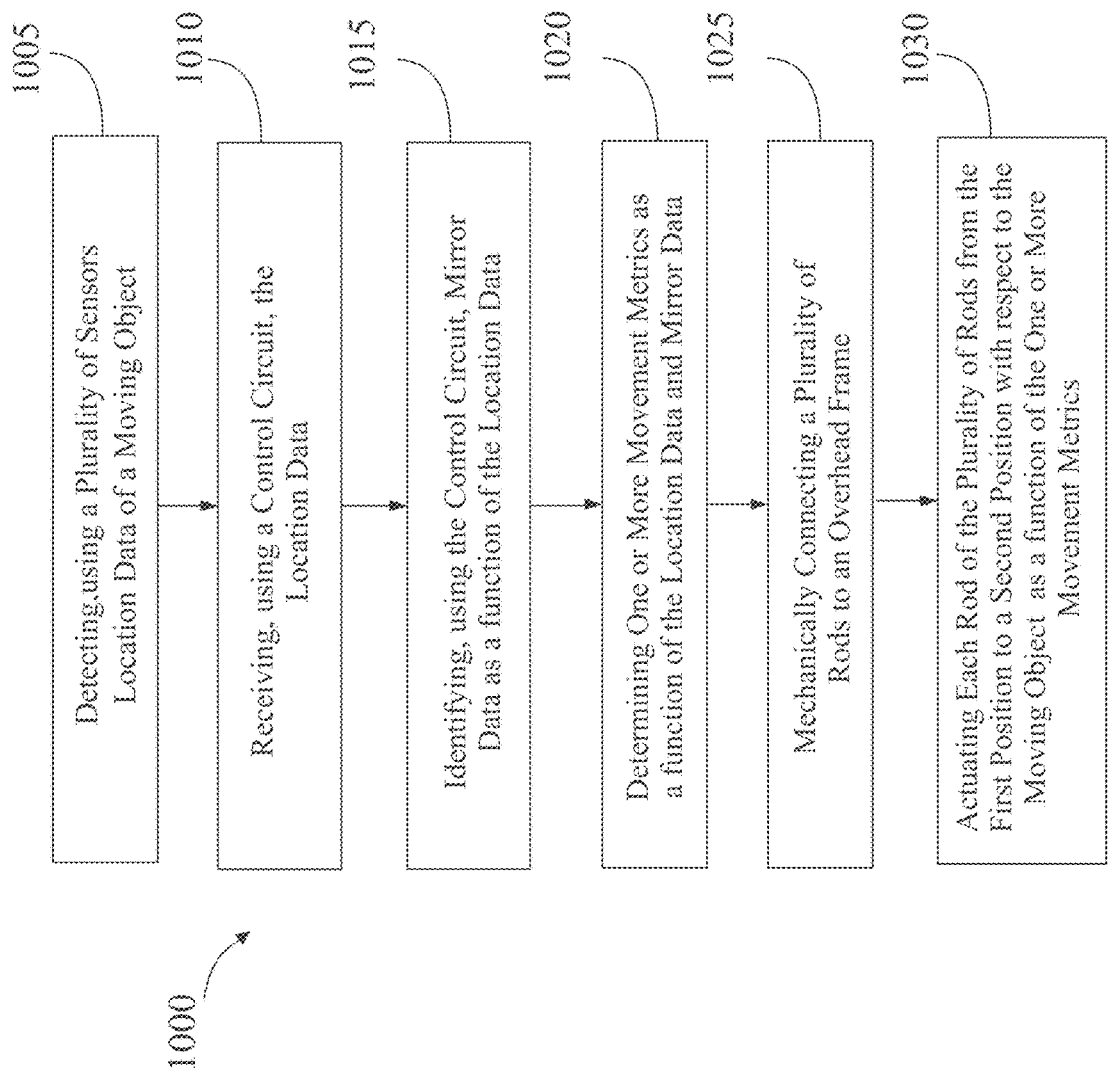
FIG. 10 is a flow diagram of an exemplary method for anti-collision monitoring within a service environment.

Referring now to FIG. 10, a flow diagram of an exemplary method 1000 for a multi-stage car wash system is illustrated. At step 1005, method 1000 includes detecting, using a plurality of sensors, location data of a moving object. This may be implemented as described and with reference to FIGS. 1-9.

Still referring to FIG. 10, at step 1010, method 1000 includes receiving, using at least a control circuit communicatively connected to the plurality of sensors, the location data. This may be implemented as described and with reference to FIGS. 1-9.

Still referring to FIG. 10, at step 1015, method 1000 includes identifying, using the at least a control circuit, mirror data as a function of the location data. This may be implemented as described and with reference to FIGS. 1-9. In an embodiment, identifying one or more movement metrics may include iteratively training a movement machine learning model using movement training data, wherein movement training data comprises a plurality of location data and mirror data as inputs correlated to examples of movement metrics as outputs. The control circuit may then generate the one or more movement metrics as a function of the location data and the mirror data using the trained movement machine learning model.

Still referring to FIG. 10, at step 1020, method 1000 includes determining, using the at least a control circuit, one or more movement metrics as a function of the location data and the mirror data. This may be implemented as described and with reference to FIGS. 1-9. In some embodiments, the method may further include a plurality of cleaning attachments mechanically connected to the plurality of rods. The plurality of cleaning attachments may include a first brush mechanically connected to a first rod of the plurality of rods, wherein the first brush is configured to hang vertically from the first rod and a second brush mechanically connected to a second rod of the plurality of rods, wherein the second brush is configured to hang vertically from the second rod. In an embodiment, the method may further include selectively moving, using a conveyor system, a vehicle forward through the overhead frame.

Still referring to FIG. 10, at step 1025, method 1000 includes mechanically connecting a plurality of rods to an overhead frame, wherein the plurality of rods is configured to extend horizontally from the overhead frame at a first position. This may be implemented as described and with reference to FIGS. 1-9. In an embodiment, the overhead frame may include a plurality of bump stops configured to restrict the movement of the plurality of rods.

Still referring to FIG. 10, at step 1030, method 1000 includes actuating, using the plurality of actuators, each rod of the plurality of rods from the first position to a second position with respect to the moving object as a function of the one or more movement metrics, wherein the plurality of actuators are mechanically connected to both the overhead frame and the plurality of rods. In an embodiment, the plurality of actuators comprises a first pneumatic actuator mechanically connected to a first rod of the plurality of rods and a second pneumatic actuator mechanically connected to a second rod of the plurality of rods. The first pneumatic actuator may be configured to actuate the first rod in a clockwise motion, while the second pneumatic actuator may be configured to actuate the second rod in a counterclockwise motion. In another embodiment, actuating each rod of the plurality of rods into one or more positions includes actuating each rod of the plurality of rods form a first position into a second position, from a second position into a third position, from a third position into a fourth position, and the like. In some cases, actuating each rod of the plurality of rods into one or more positions may include actuating each rod of the plurality of rods into a bumped-out position as a function of the one or more movement metrics and the mirror data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
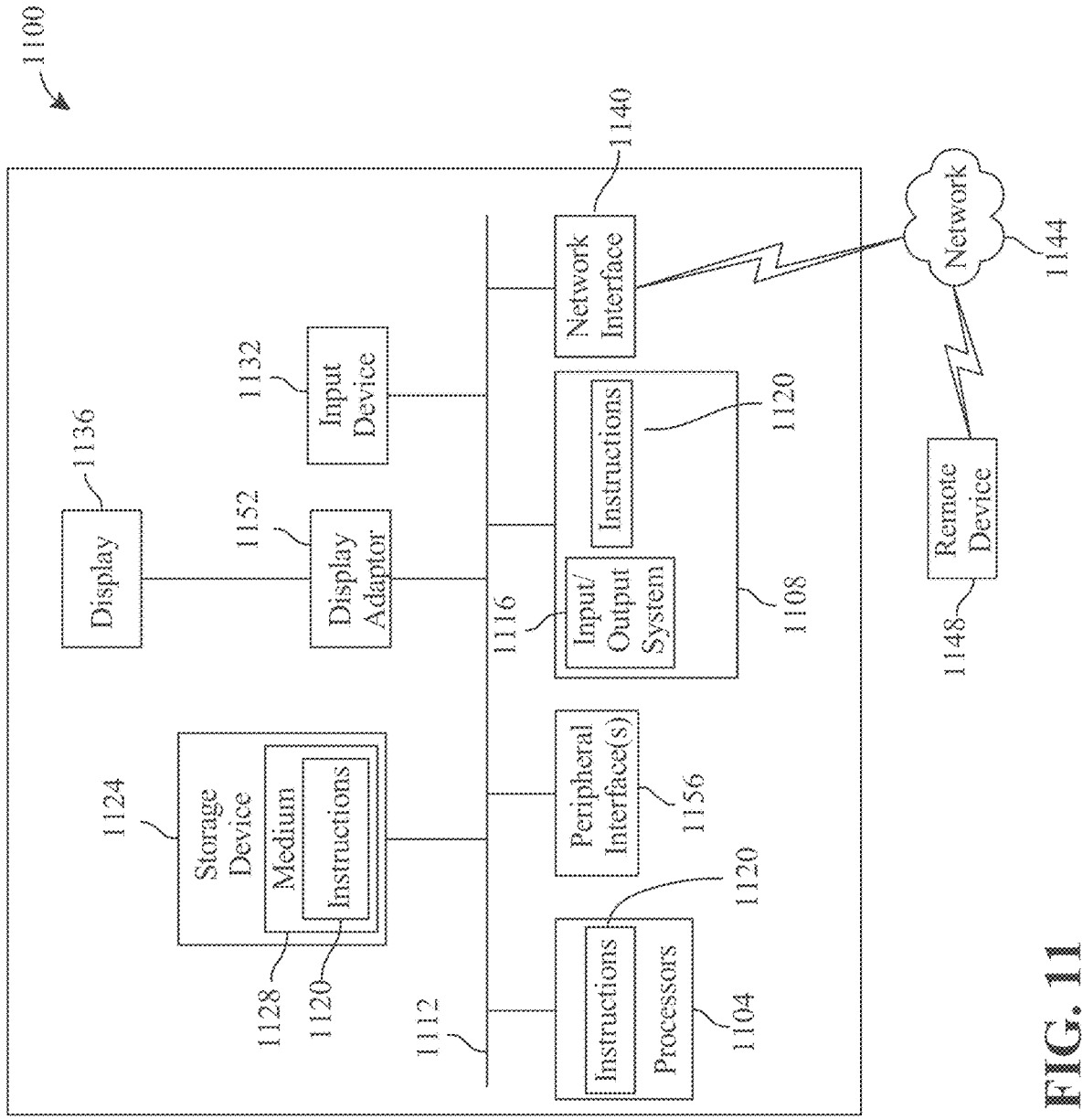
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 13114 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for a multi-stage car wash system, wherein the apparatus comprises:
    a plurality of sensors, wherein the plurality of sensors is configured to detect location data of a moving object;
    a control circuit communicatively connected to the plurality of sensors and a plurality of actuators, wherein the control circuit is configured to:
        receive the location data from the plurality of sensors;
        identify mirror data as a function of the location data; and
        determine one or more movement metrics of the moving object as a function of the location data and the mirror data, wherein the one or more movement metrics comprises at least a brush retraction speed;
    an overhead frame mechanically connected to a plurality of rods using an attachment mechanism, wherein the plurality of rods is configured to extend horizontally from the overhead frame at a first position, wherein the overhead frame comprises modular sections; and
    the plurality of actuators mechanically connected to the overhead frame and the plurality of rods, wherein each actuator of the plurality of actuators is configured to actuate each rod of the plurality of rods from the first position to a second position with respect to the moving object as a function of the one or more movement metrics.

2. The apparatus of claim 1, wherein the plurality of actuators comprises:
    a first pneumatic actuator mechanically connected to a first rod of the plurality of rods; and
    a second pneumatic actuator mechanically connected to a second rod of the plurality of rods.

3. The apparatus of claim 2, wherein:
    the first pneumatic actuator is configured to actuate the first rod from the first position to the second position in a clockwise motion; and
    the second pneumatic actuator is configured to actuate the second rod from the first position to the second position in a counter-clockwise motion.

4. The apparatus of claim 1, wherein actuating each rod of the plurality of rods into one or more positions comprises:
    actuating each rod of the plurality of rods from the second position into a third position as a function of the one or more movement metrics; and
    actuating each rod of the plurality of rods form the third position into a fourth position as function of the one or more movement metrics and the mirror data.

5. The apparatus of claim 1, wherein the second position comprises a bumped-out position.

6. The apparatus of claim 1, wherein the apparatus further comprises a plurality of cleaning attachments mechanically connected to the plurality of rods.

7. The apparatus of claim 6, wherein the plurality of cleaning attachments comprises:
    a first brush mechanically connected to a first rod of the plurality of rods, wherein the first brush is configured to hang vertically from the first rod; and
    a second brush mechanically connected to a second rod of the plurality of rods, wherein the second brush is configured to hang vertically from the second rod.

8. The apparatus of claim 1, wherein the apparatus additionally comprises a conveyor system configured to selectively move a vehicle forward through the overhead frame.

9. The apparatus of claim 1, wherein the overhead frame comprises a plurality of bump stops configured to restrict the movement of the plurality of rods.

10. The apparatus of claim 1, wherein generating one or more movement metrics comprises:
    iteratively training a movement machine learning model using movement training data, wherein movement training data comprises a plurality of location data and mirror data as inputs correlated to examples of movement metrics as outputs; and
    generating the one or more movement metrics as a function of the location data and the mirror data using the trained movement machine learning model.

11. A method for a multi-stage car wash system, wherein the method comprises:
    detecting, using a plurality of sensors, location data of a moving object;
    receiving, using at least a control circuit communicatively connected to the plurality of sensors, the location data;
    identifying, using the at least a control circuit, mirror data as a function of the location data;
    determining, using the at least a control circuit, one or more movement metrics of the moving object as a function of the location data and the mirror data, wherein the one or more movement metrics comprises at least a brush retraction speed;
    mechanically connecting, using an attachment mechanism, a plurality of rods to an overhead frame, wherein the plurality of rods is configured to extend horizontally from the overhead frame at a first position, wherein the overhead frame comprises modular sections; and
    actuating, using the plurality of actuators, each rod of the plurality of rods from the first position to a second position with respect to the moving object as a function of the one or more movement metrics, wherein the plurality of actuators are mechanically connected to both the overhead frame and the plurality of rods.

12. The method of claim 11, wherein the plurality of actuators comprises:
    a first pneumatic actuator mechanically connected to a first rod of the plurality of rods; and
    a second pneumatic actuator mechanically connected to a second rod of the plurality of rods.

13. The method of claim 12, wherein:
    the first pneumatic actuator is configured to actuate the first rod from the first position to the second position in a clockwise motion; and
    the second pneumatic actuator is configured to actuate the second rod from the first position to the second position in a counter-clockwise motion.

14. The method of claim 11, wherein actuating each rod of the plurality of rods into one or more positions comprises:

actuating each rod of the plurality of rods from the second position into a third position as a function of the one or more movement metrics; and actuating each rod of the plurality of rods form the third position into a fourth position as function of the one or more movement metrics and the mirror data.

15. The method of claim 11, wherein the second position comprises a bumped-out position.

16. The method of claim 11, wherein the method further comprises mechanically connecting a plurality of cleaning attachments to the plurality of rods.

17. The method of claim 16, wherein the plurality of cleaning attachments comprises:
a first brush mechanically connected to a first rod of the plurality of rods, wherein the first brush is configured to hang vertically from the first rod; and
a second brush mechanically connected to a second rod of the plurality of rods, wherein the second brush is configured to hang vertically from the second rod.

18. The method of claim 11, wherein the method comprises selectively moving, using a conveyor system, a vehicle forward through the overhead frame.

19. The method of claim 11, wherein the overhead frame comprises a plurality of bump stops configured to restrict the movement of the plurality of rods.

20. The method of claim 11, wherein generating one or more movement metrics comprises:
iteratively training a movement machine learning model using movement training data, wherein movement training data comprises a plurality of location data and mirror data as inputs correlated to examples of movement metrics as outputs; and generating the one or more movement metrics as a function of the location data and the mirror data using the trained movement machine learning model.

* * * * *